US011663106B2

(12) United States Patent
Chaiken et al.

(10) Patent No.: US 11,663,106 B2
(45) Date of Patent: May 30, 2023

(54) SYSTEMS AND METHODS FOR MITIGATING FAILURE TO ENTER STANDBY MODE

(71) Applicant: Dell Products L.P., Round Rock, TX (US)

(72) Inventors: Craig Chaiken, Pflugerville, TX (US); Adolfo S. Montero, Pflugerville, TX (US); Siva Subramaniam Rajan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/185,630

(22) Filed: Feb. 25, 2021

(65) Prior Publication Data

US 2022/0269574 A1 Aug. 25, 2022

(51) Int. Cl.
*G06F 11/32* (2006.01)
*G06F 9/4401* (2018.01)

(52) U.S. Cl.
CPC .......... *G06F 11/325* (2013.01); *G06F 9/4418* (2013.01)

(58) Field of Classification Search
CPC .............................. G06F 11/325; G06F 9/4418
See application file for complete search history.

(56) References Cited

U.S. PATENT DOCUMENTS

| 6,690,277 | B1 * | 2/2004 | Hansen | G08B 13/1454 340/568.2 |
|---|---|---|---|---|
| 2008/0082918 | A1 * | 4/2008 | Hwang | G06F 1/30 713/340 |
| 2008/0126815 | A1 * | 5/2008 | Cantwell | G06F 1/329 713/323 |
| 2011/0252225 | A1 * | 10/2011 | Liu | G06F 9/4418 713/300 |
| 2016/0069651 | A1 * | 3/2016 | Gull Gazit | F41H 13/0018 361/232 |
| 2016/0126782 | A1 * | 5/2016 | Jo | G09G 3/20 307/126 |
| 2018/0120922 | A1 * | 5/2018 | Hsu | G06F 1/3287 |

* cited by examiner

*Primary Examiner* — Thomas D Alunkal
(74) *Attorney, Agent, or Firm* — Jackson Walker L.L.P.

(57) ABSTRACT

An information handling system may include a processor, a visual indicator, and a management controller communicatively coupled to the processor and the visual indicator and configured to perform out of band management of the information handling system, the management controller further configured to, responsive to receiving an indication from the processor that the information handling system is attempting to enter a standby mode and prior to the information handling system entering the standby mode, cause the visual indicator to generate a visual indication that the information handling system is attempting to enter the standby mode.

16 Claims, 4 Drawing Sheets

SYSTEMS AND METHODS FOR MITIGATING FAILURE TO ENTER STANDBY MODE

TECHNICAL FIELD

The present disclosure relates in general to information handling systems, and more particularly to systems and methods for mitigating a failure of an information handling system to enter a standby mode.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is well-known that information handling systems may operate in a plurality of sleep states. For example, Advanced Configured and Power State Interface (ACPI) defines sleep states S0-S5 as follows:

S0—a normal powered-on state.

S1 (Standby)—a low wake latency sleeping state, in which no system context (e.g., processor and chip set) is lost and hardware maintains all system contexts.

S3 (Suspend to RAM): a low wake latency sleeping state similar to S1 except that the CPU and system cache context is lost.

S4 (Suspend to Disk): the S4 state is the lowest power, longest wake latency sleeping state supported by ACPI. In order to reduce power to a minimum, it is assumed that the hardware platform has powered off all devices and platform context is maintained.

S5—powered off.

More recently, information handling systems have been enabled with a Modern Standby state which in a sense replaces S3 as a way to emulate a smart phone experience on an information handling system, in that a tap of a display screen may immediately bring the display screen to life, minimizing power consumption when the screen is powered down. However, in contrast to S3 in which multiple information handling system components may be physically powered down to maximum power efficiency, the approach in Modern Standby includes maintaining an operating system in S0 but in a very low power mode known as S0iX. To enter S0iX, a display device may be powered down, a processor may be placed in its C10 state (meaning clocks are mostly turned off), and all motherboard devices are placed in a D3 state, wherein a device may be placed in a D3-hot state in which it remained powered on or a D3-cold state in which it is powered off. Each device driver is responsible for bringing its respective driver from a D0 (powered on) state to the D3 state. However, in some instances, a device driver may fail to cause its respective device to enter D3, keeping an information handling system from entering Modern Standby, as Modern Standby requires that all device drivers transition their respective devices to D3.

Failure to enter into Modern Standby may have negative consequences. One disadvantage may be a "system in a bag" scenario, in which a user may place an information handling system in a backpack, sleeve, bag, briefcase, or other container assuming the information handling system has entered Modern Standby. However, due to failure to enter Modern Standby, heat-generating components of the information handling system may remain powered on, and the presence of the information handling system in the bag may cause such heat to be retained, potentially causing overheating of the information handling system.

Another disadvantage may be that components that remain powered on may cause a battery of the information handling system to undesirably drain charge.

SUMMARY

In accordance with the teachings of the present disclosure, the disadvantages and problems associated with failure to enter a standby mode in an information handling system may be reduced or eliminated.

In accordance with embodiments of the present disclosure, an information handling system may include a processor, a visual indicator, and a management controller communicatively coupled to the processor and the visual indicator and configured to perform out of band management of the information handling system, the management controller further configured to, responsive to receiving an indication from the processor that the information handling system is attempting to enter a standby mode and prior to the information handling system entering the standby mode, cause the visual indicator to generate a visual indication that the information handling system is attempting to enter the standby mode.

In accordance with these and other embodiments of the present disclosure, a method may include, in an information handling system comprising a processor and a visual indicator and by a management controller communicatively coupled to the processor and the visual indicator and configured to perform out of band management of the information handling system: responsive to receiving an indication from the processor that the information handling system is attempting to enter a standby mode and prior to the information handling system entering the standby mode, causing the visual indicator to generate a visual indication that the information handling system is attempting to enter the standby mode.

In accordance with these and other embodiments of the present disclosure, an article of manufacture may include a non-transitory computer-readable medium and computer-executable instructions carried on the computer-readable medium, the instructions readable by a management controller of an information handling system and configured to perform out of band management of the information handling system, the instructions, when read and executed, for causing the management controller to: responsive to receiving an indication from a processor of the information handling system that the information handling system is attempting to enter a standby mode and prior to the information handling system entering the standby mode, causing a visual indicator of the information handling system to generate a visual indication that the information handling system is attempting to enter the standby mode.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
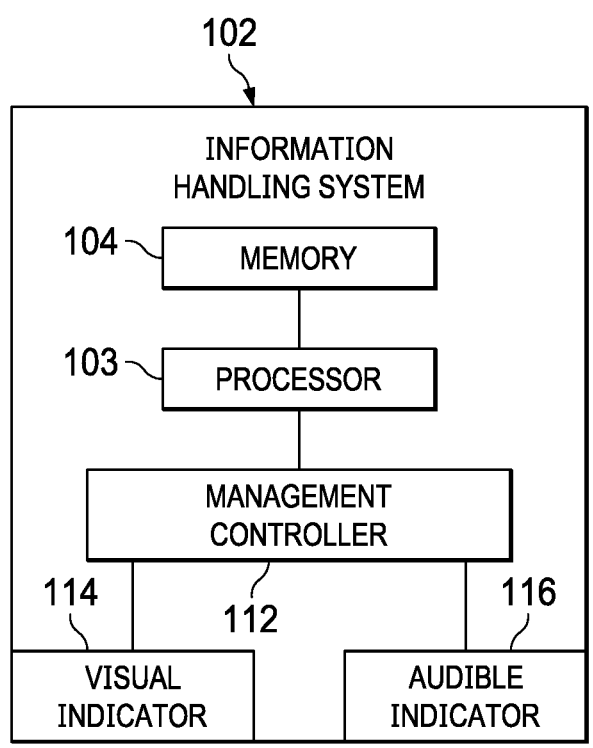
FIG. 1 illustrates a block diagram of an example information handling system, in accordance with embodiments of the present disclosure.
Figure 2A:
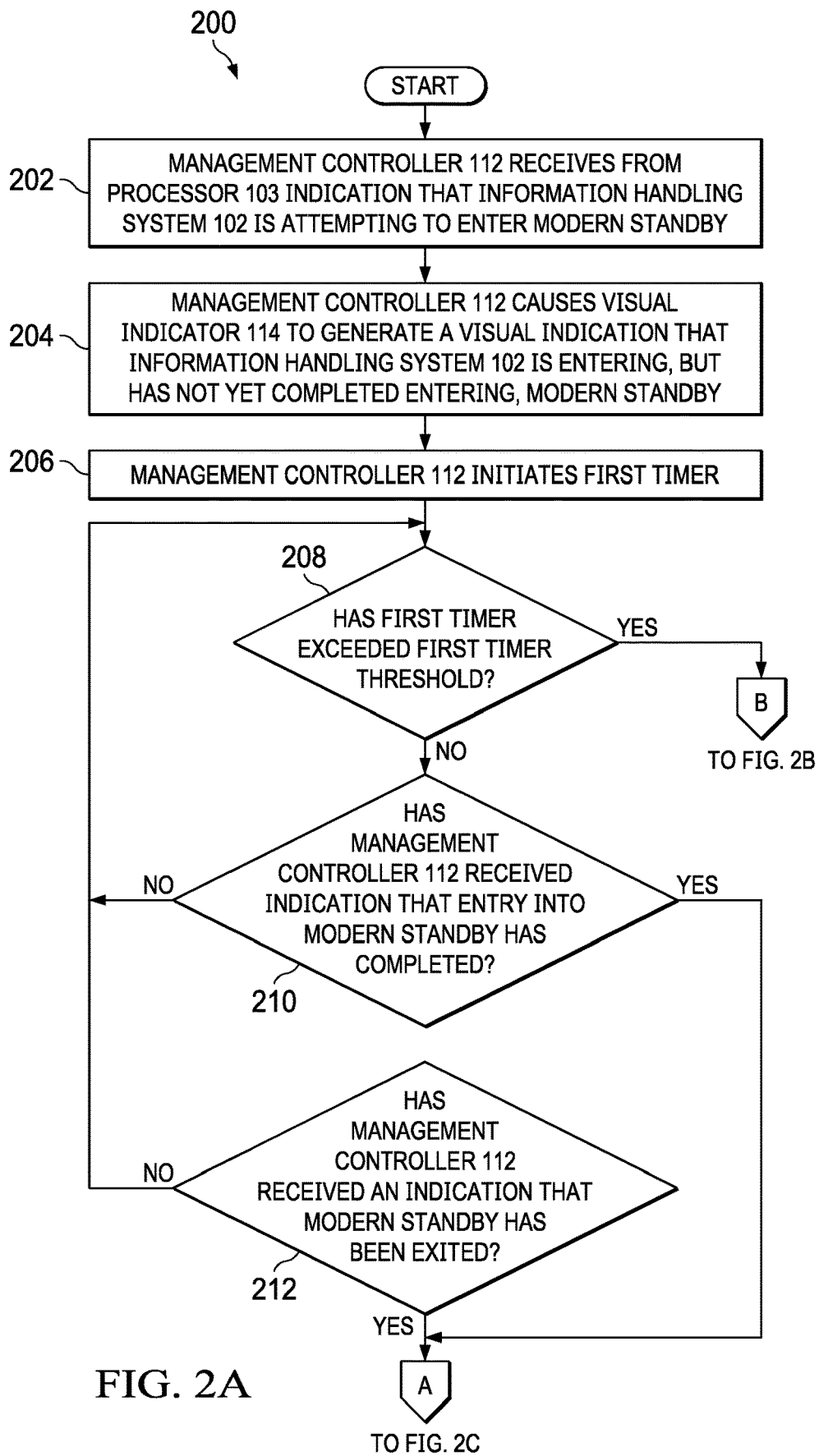
FIGS. 2A-2C (which may be collectively referred to herein as "FIG. 2") illustrate a flow chart of an example method for compensating for mitigating failure of an information handling system to enter a standby mode, in accordance with embodiments of the present disclosure.
Figure 2B:
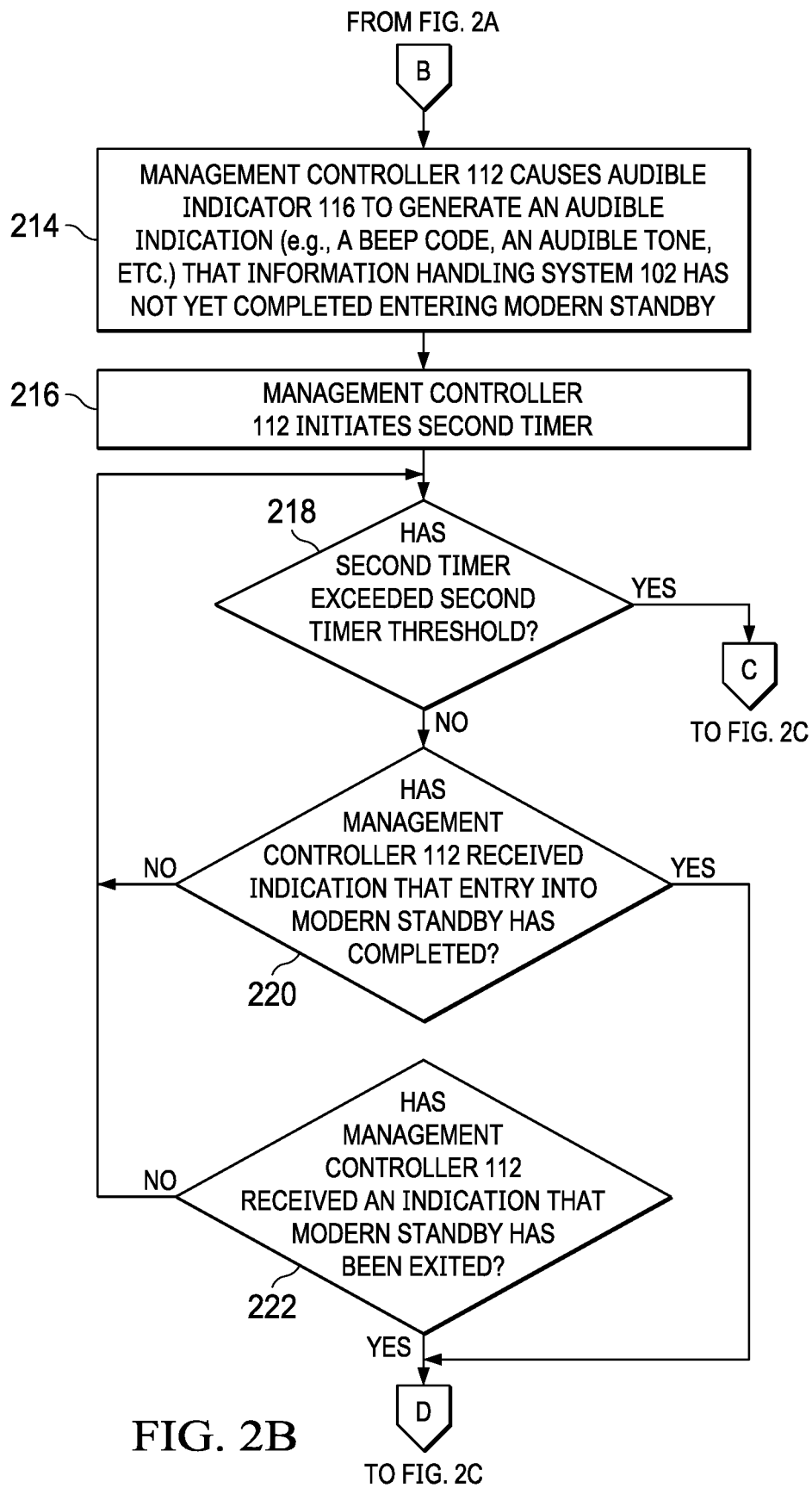
Figure 2C:
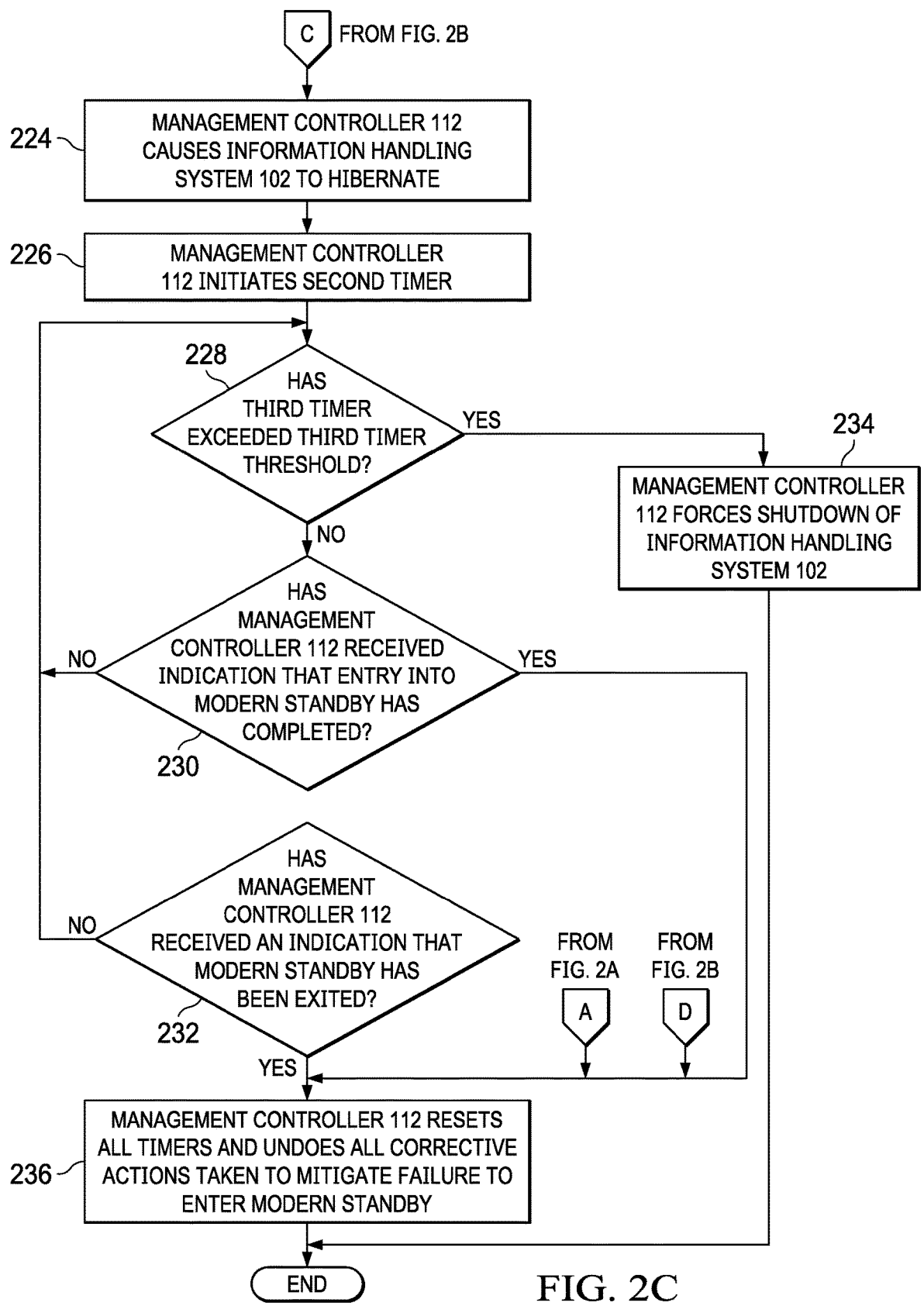

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

FIG. 1 illustrates a block diagram of an example information handling system 102, in accordance with embodiments of the present disclosure. In some embodiments, an information handling system 102 may comprise a server. In these and other embodiments, an information handling system 102 may comprise a personal computer. In other embodiments, an information handling system 102 may be a portable computing device (e.g., a laptop, notebook, tablet, handheld, smart phone, personal digital assistant, etc.). As depicted in FIG. 1, an information handling system 102 may include a processor 103, a memory 104 communicatively coupled to processor 103, a management controller 112 communicatively coupled to processor 103, a visual indicator 114 communicatively coupled to management controller 112, and an audible indicator 116 communicatively coupled to management controller 112.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

A memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Management controller 112 may be configured to provide management facilities for management of information handling system 102. Such management may be made by management controller 112 even if information handling system 102 is powered off or powered to a standby state. Management controller 112 may include a processor, a memory, and/or other components. In certain embodiments, management controller 112 may include or may be an integral part of an embedded controller (EC), baseboard management controller (BMC), or a remote access controller (e.g., a Dell Remote Access Controller or Integrated Dell Remote Access Controller).

Visual indicator 114 may include any system, device, or apparatus configured to provide a human-perceptible visual indication of an event. For example, visual indicator 114 may include a light-emitting diode, or other sources of light. In some embodiments, visual indicator 114 may include a visual indicator having functionality other than for use in the techniques for mitigating failure to enter into a standby mode described herein. For example, in some embodiments, visual indicator 114 may comprise a battery status light-emitting diode normally operable to indicate status of a battery and the techniques disclosed herein for mitigating failure to enter into a standby mode may leverage such battery status light-emitting diode in order to minimize hardware components of information handling system 102.

Audible indicator 116 may include any system, device, or apparatus configured to provide a human-perceptible audible indication of an event. For example, audible indicator 116 may include a loudspeaker. In some embodiments, audible indicator 116 may include a visual indicator having functionality other than for use in the techniques for mitigating failure to enter into a standby mode described herein. For example, in some embodiments, audible indicator 116 may comprise a system speaker of information handling system 102 normally operable to playback sounds generated by an operating system of information handling system 102.

FIG. 2 illustrates a flow chart of an example method 200 for compensating for mitigating failure of an information handling system to enter a standby mode, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, management controller 112 may receive from processor 103 (e.g., via an ACPI hook) an indication that information handling system 102 is attempting to enter Modern Standby. For example, processor 103 may communicate such indication in response to a user action, such as a user interacting with a power button or sleep button of information handling system 102, a user physically closing information handling system 102 (e.g., when information handling system 102 includes a notebook or laptop computer), and/or other suitable stimulus.

At step 204, in response to receiving such indication, management controller 112 may cause visual indicator 114 to generate a visual indication that information handling system 102 is entering, but has not yet completed entering, Modern Standby. For example, in embodiments in which visual indicator 114 is a battery status light-emitted diode, such visual indication may include an indication (e.g., slow blinking on and off or "breathing") other than an indication or light pattern that may be used to communicate battery status. Such visual indication may indicate to a user that entry into Modern Standby has not yet completed, so that the user may take corrective action.

At step 206, management controller 112 may initiate a first timer. At step 208, management controller 112 may determine if the first timer has exceeded a first timer threshold (e.g., three minutes). If the first timer has exceeded the first timer threshold, method 200 may proceed to step 214. Otherwise, method 200 may proceed to step 210.

At step 210, management controller 112 may determine if management controller 112 has received an indication that entry into Modern Standby has completed. If entry into Modern Standby has completed, method 200 may proceed to step 236. Otherwise, method 200 may proceed to step 212.

At step 212, management controller 112 may determine if management controller 112 has received an indication that Modern Standby has been exited (e.g., due to information handling system 102 waking due to user action). If entry into Modern Standby has completed, method 200 may proceed to step 236. Otherwise, method 200 may proceed again to step 208.

At step 214, in response to the first timer exceeding the first timer threshold, management controller 112 may cause audible indicator 116 to generate an audible indication (e.g., a beep code, an audible tone, etc.) that information handling system 102 has not yet completed entering Modern Standby. Such audible indication may indicate to a user that entry into Modern Standby has not yet completed, so that the user may take corrective action.

At step 216, management controller 112 may initiate a second timer. At step 218, management controller 112 may determine if the second timer has exceeded a second timer threshold (e.g., fifteen minutes). If the second timer has exceeded the second timer threshold, method 200 may proceed to step 224. Otherwise, method 200 may proceed to step 220.

At step 220, management controller 112 may determine if management controller 112 has received an indication that entry into Modern Standby has completed. If entry into Modern Standby has completed, method 200 may proceed to step 236. Otherwise, method 200 may proceed to step 222.

At step 222, management controller 112 may determine if management controller 112 has received an indication that Modern Standby has been exited (e.g., due to information handling system 102 waking due to user action). If entry into Modern Standby has completed, method 200 may proceed to step 236. Otherwise, method 200 may proceed again to step 218.

At step 224, in response to the second timer exceeding the second timer threshold, management controller 112 may cause information handling system 102 to hibernate. Such hibernation may mitigate negative effects that may result from failure to enter Modern Standby, such as overheating and/or battery depletion, as described in the Background section of this application.

At step 226, management controller 112 may initiate a third timer. At step 228, management controller 112 may determine if the third timer has exceeded a third timer threshold (e.g., five minutes). If the third timer has exceeded the third timer threshold, method 200 may proceed to step 234. Otherwise, method 200 may proceed to step 230.

At step 230, management controller 112 may determine if management controller 112 has received an indication that entry into Modern Standby has completed. If entry into Modern Standby has completed, method 200 may proceed to step 236. Otherwise, method 200 may proceed to step 232.

At step 232, management controller 112 may determine if management controller 112 has received an indication that Modern Standby has been exited (e.g., due to information handling system 102 waking due to user action). If entry into Modern Standby has completed, method 200 may proceed to step 236. Otherwise, method 200 may proceed again to step 228.

At step 234, in response to the third timer exceeding the third timer threshold, management controller 112 may force a shutdown of information handling system 102. Such shutdown may mitigate negative effects that may result from failure to enter Modern Standby, such as overheating and/or battery depletion, as described in the Background section of this application. After completion of step 234, method 200 may end.

At step 236, in response to entry into Modern Standby being completed, management controller 112 may reset all timers (e.g., first timer, second timer, third timer, etc.) and undo all corrective actions taken to mitigate failure to enter Modern Standby (e.g., visual indication by visual indictor 114, audible indication by audible indicator 116, hibernation, etc.). After completion of step 236, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

In addition to or in lieu of the actions described above for mitigating failure to enter Modern Standby, management controller 112 may take or cause one or more other mitigating actions, one, some, or all of which may also be taken or caused by expiration of a respective timer. Such one or more other mitigating actions may include, without limitation, changes in rotational velocity of an air mover (e.g., fan or blower) of information handling system 102, haptic vibration by a haptic actuator, saving of data to a network cloud to prevent data loss in case information handling system 102 enters a forced shutdown, generation of an alert to a management console regarding failure to enter Modern Standby, throttling of processor 103 and/or other hardware if an attempt to force hibernation of information handling system 102 fails, throttling of processor 103 and/or other hardware to reduce battery discharging, and/or other mitigating actions.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a processor;
a visual indicator;
an audible indicator; and
a management controller communicatively coupled to the processor, the visual indicator, and the audile indicator and configured to perform out of band management of the information handling system, the management controller further configured to:
responsive to receiving an indication from the processor that the information handling system is attempting to enter a standby mode in response to a user action and prior to the information handling system entering the standby mode, initiate a timer and cause the visual indicator to generate a visual indication that the information handling system is attempting to enter the standby mode; and
responsive to detecting the timer exceeding a timer threshold before receiving an indication that entry into standby mode completed, cause the audible indicator to generate an audible indication.

2. The information handling system of claim 1, wherein the standby mode is Modern Standby.

3. The information handling system of claim 1, wherein the visual indicator is a light-emitting indicator also used for indicating a status associated with a battery of the information handling system.

4. The information handling system of claim 1, wherein the management controller is further configured to cause the information handling system to hibernate after passage of a period of time after receipt of the indication from the processor that the information handling system is attempting to enter the standby mode.

5. The information handling system of claim 1, wherein the management controller is further configured to cause the information handling system to shut down after passage of a period of time after receipt of the indication from the processor that the information handling system is attempting to enter the standby mode.

6. The information handling system of claim 1, wherein the management controller is further configured to cause performing one or more mitigating actions responsive to detecting the timer exceeding a timer threshold before receiving an indication that entry into standby mode completed.

7. The information handling system of claim 6, wherein the one or more mitigating actions comprise one or more of the following: changes in rotational velocity of an air mover of the information handling system, haptic vibration by a haptic actuator, saving of data to a network cloud to prevent data loss, generation of an alert to a management console regarding failure to enter the standby mode, and throttling of the processor and/or other hardware components of the information handling system.

8. A method comprising, in an information handling system comprising a processor, an audible indicator, and a visual indicator and by a management controller communicatively coupled to the processor, the audible indicator, and the visual indicator and configured to perform out of band management of the information handling system:
responsive to receiving an indication from the processor that the information handling system is attempting to enter a standby mode in response to a user action and prior to the information handling system entering the standby mode, initiating a timer and causing the visual indicator to generate a visual indication that the information handling system is attempting to enter the standby mode; and
responsive to detecting the timer exceeding a timer threshold before receiving an indication that entry into standby mode completed, causing the audible indicator to generate an audible indication.

9. The method of claim 8, wherein the standby mode is Modern Standby.

10. The method of claim 8, wherein the visual indicator is a light-emitting indicator also used for indicating a status associated with a battery of the information handling system.

11. The method of claim 8, further comprising causing the information handling system to hibernate after passage of a period of time after receipt of the indication from the processor that the information handling system is attempting to enter the standby mode.

12. The method of claim 8, further comprising causing the information handling system to shut down after passage of a period of time after receipt of the indication from the processor that the information handling system is attempting to enter the standby mode.

13. The method of claim 8, further comprising causing performance of one or more mitigating actions responsive to detecting the timer exceeding a timer threshold before receiving an indication that entry into standby mode completed.

14. The method of claim 13, wherein the one or more mitigating actions comprise one or more of the following: changes in rotational velocity of an air mover of the information handling system, haptic vibration by a haptic actuator, saving of data to a network cloud to prevent data loss, generation of an alert to a management console regarding failure to enter the standby mode, and throttling of the processor and/or other hardware components of the information handling system.

15. An article of manufacture comprising:
a non-transitory computer-readable medium; and
computer-executable instructions carried on the computer-readable medium, the instructions readable by a management controller of an information handling system and configured to perform out of band management of the information handling system, the instructions, when read and executed, for causing the management controller to:
responsive to receiving an indication from a processor of the information handling system that the information handling system is attempting to enter a standby mode in response to a user action and prior to the information handling system entering the standby mode, initiating a timer and causing a visual indicator of the information handling system to generate a visual indication that the information handling system is attempting to enter the standby mode; and
responsive to detecting the timer exceeding a timer threshold before receiving an indication that entry into standby mode completed, cause the audible indicator to generate an audible indication.

16. The article of manufacture of claim 15, wherein the visual indicator is a light-emitting indicator also used for indicating a status associated with a battery of the information handling system.

* * * * *